April 11, 1939. C. O. BALL 2,153,542
METHOD OF PROCESSING MILK PRODUCTS
Filed Jan. 29, 1935 4 Sheets-Sheet 1

Fig. 1

INVENTOR
Charles O. Ball
BY
ATTORNEYS

April 11, 1939.  C. O. BALL  2,153,542
METHOD OF PROCESSING MILK PRODUCTS
Filed Jan. 29, 1935  4 Sheets-Sheet 2

Fig. 2

INVENTOR
Charles O. Ball
BY Ivan A. Thornburgh
Charles H. ___
ATTORNEYS

Patented Apr. 11, 1939

2,153,542

UNITED STATES PATENT OFFICE 2,153,542

METHOD OF PROCESSING MILK PRODUCTS

Charles O. Ball, Oak Park, Ill., assignor to American Can Company, New York, N. Y., a corporation of New Jersey Application January 29, 1935, Serial No. 3,951

2 Claims. (Cl. 99—184)

The present invention relates to a method for canning milk products or the like and has particular reference to preheating, canning and sterilizing milk products under great pressure and heat and with great rapidity so that a sterilized whole milk, a sterilized evaporated milk, a sterilized cream or similar sterilized milk products are obtained that closely simulate the natural milk or cream.

An object of the invention is the provision of a method of canning and sterilizing milk products wherein the raw or evaporated milk or the cream is forced under pressure as a thin film through a preheating step at which time a sterilizing heat is stored therein, the product being then sealed in cans under pressure to complete the sterilizing action which begins with forewarming and which continues while the heated milk is being canned, the canned and sterilized product being finally cooled in part at least under pressure.

Another object is the provision of a method of canning and sterilizing milk products under great pressures and heat and with agitation which is imparted to the product after it has been sealed in the can and during final sterilization and cooling resulting in a product which has not suffered impairment of taste, color or other natural qualities of the milk.

A still further object of the invention is the provision of a canning and sterilizing method for evaporated milk which comprises imparting a sterilizing heat to the liquid and sealing into cans, thence sterilizing the sealed cans under pressure and agitation during the holding time wherein viscosity in the milk is built up to a desired degree.

A further object of the invention is the provision of a method for canning and sterilizing milk products by saturated steam under great pressures, a sterilizing heat being first imparted to the liquid before it is sealed in the cans and then heat and pressure are continued after sealing to prevent loss of heat from the milk so that a fully sterilized and canned milk product is obtained which has substantially all of the desirable taste, color, etc., characteristic of the natural product.

Yet another object is the provision of a canning and sterilizing method for milk products and the like, the various steps taking place under pressures of different degrees and under different temperatures which are separately maintained to effect a rapid, continuous action.

Numerous other objects and advantages of the invention will be apparent as it is better understood from the following description, which, taken in connection with the accompanying drawings, discloses a preferred embodiment thereof.

Referring to the drawings.

The invention contemplates the bringing of a milk or a milk product into a closed forewarming chamber and imparting to the milk a high sterilizing temperature by first passing it, as by means of a pump, under great pressure and between spaced surfaces. The milk in this passage is separated into a film-like form and the film as it passes through the chamber receives its sterilizing heat from the spaced surfaces. These surfaces are maintained at high temperature by saturated steam held under high pressure and as the passing milk takes up the heat, more heat is continually supplied to the surfaces.

The heated milk is then deposited or filled as soon as practical into a can, the filling step being carried out in a closed filling chamber which is preferably maintained at a temperature substantially above the boiling point of the milk at atmospheric pressure. The filling chamber is also maintained at a pressure sufficiently high to prevent boiling of the heated milk. The can into which the milk is deposited has previously entered the filling chamber by means of an entrance valve.

While still in the filling chamber and still under pressure and heat each filled can is supplied with a cover and can and cover are introduced into a closing machine such as a double seamer where the cover is hermetically united to the can. The closing machine may be in a separate closed sealing chamber connecting with the filling chamber or both filling and sealing chambers may be combined in one unit under the same heat and pressure.

The filling and sealing chambers may be supplied with either a sterile or a non-sterile atmosphere. A pressure within the chambers sufficiently high to prevent boiling or foaming of heated milk prior to sealing in the can is required and saturated steam under sufficient pressure has been found satisfactory to produce a sterile atmosphere.

However, a sterile atmosphere is not necessary and the required chamber pressures may be provided by a suitable non-condensible gas such as air. Any bacterial contamination which might take place in the filling or the sealing chambers will be overcome in the sterilization steps following the sealing of the milk into the cans as will be fully explained hereinafter.

Such air or other gas, either sterile or non-sterile, may be at substantially the same temperature as the milk or it may be slightly higher or lower in temperature. Where saturated steam is used its temperature will ordinarily be a few degrees higher than the temperature of the milk since a slightly higher pressure than the vapor pressure of the milk must be obtained to prevent boiling or foaming as aforesaid. It will be recalled the stored up heat in the milk which is its potential sterilizing heat has been imparted to it while in film form.

In some installations therefore a non-condensible gas such as compressed air may be introduced into the filling and sealing chambers to provide the required pressure. Such air, furthermore, may be at a high temperature and thus also provide a heating as well as a pressure medium.

During the passage of the milk through the filling and the sealing chambers the sterilizing heat which was stored in the milk while in film form within the forewarming chamber is carrying on sterilization. The supplying of further heat at high temperatures to the chamber at such time accelerates this sterilizing procedure by preventing loss of such initially stored heat, but it is possible to dispense with the addition of further heat at this time, i. e., during filling and sealing, so long as a pressure is maintained in the filling and sealing chambers sufficient to prevent boiling of the milk owing to its stored heat.

An exit valve is used to pass the sealed can from the sealing chamber into a closed sterilizing or holding chamber which is also maintained at a high temperature and under pressure in excess of atmospheric pressure. This temperature is to prevent loss of the stored up heat in the milk during its sterilization and the sterilization of the interior can surfaces. By reason of the transfer valve the holding chamber is independent of the sealing chamber and its heat and pressure may be entirely different from the heat and pressure of the other two chambers depending upon canning conditions.

An agitating apparatus is located in the holding chamber and this may take the form of a revolving cradle which receives the cans as they pass through the transfer valve and conveys them through an extended line of travel within the holding chamber. The cans are in this chamber for a time sufficient in length to complete the sterilization of the product. This cradle while advancing the cans along their path of travel turns them over and over sufficiently to agitate the enclosed contents. This agitation preferably continues throughout the entire time the cans are in the chamber.

Provision is made for varying the amount of time the cans are in the chamber by changing in effect the length of the path of travel of the cans. This variation is desirable as the particular type of milk product being processed affects the length of time of sterilization.

Where evaporated milk or other milk product such as cream that requires a definite viscosity is being processed such viscosity is built up during the sterilization step in the sterilizing or holding chamber. The degree of viscosity obtained is controlled by temperature of the milk, the amount of agitation, and the length of time the product is in the holding chamber.

After the sterilization action is completed the cans are removed from the holding chamber and are passed into a pressure cooling chamber. A transfer valve is utilized at this place to pass the cans out of the holding chamber and at the same time to prevent loss of the chamber pressure and heat. This valve also functions as a feeding device for placing the cans into the cooling chamber.

An agitating apparatus is also provided for the pressure cooling chamber and this may be of the same form and design as that used in the holding chamber just described. A suitable form of cooling medium for the cooling chamber is provided by cold water which is circulated through the lower part of the chamber. The cans during their travel through the cooling chamber are immersed in the water.

Air under pressure in excess of atmospheric pressure is introduced into the cooling chamber and into a head space over the cooling water, thus imparting a pressure effective in the water as well as in the head space. This maintains a pressure upon the cans while in the chamber and minimizes strains on the can seams and prevents bursting of the cans. This is necessary, for the cans, when first received for cooling, have their contents at substantially the same high temperature and pressure as existed in the milk at the time of filling into the cans.

Sufficient of the heat of the can and of its contents is dissipated in the pressure cooling chamber so that when removed therefrom the internal pressure within the can is reduced to a degree of safety permitting the can to be brought out into the open. The cans, however, are still hot and it is desirable that they be cooled still further. Removal of the cans from the pressure cooling chamber is effected by a transfer valve which also maintains an air and liquid tight seal at the exit end of the pressure cooling chamber.

For obtaining the best results it is desirable to further agitate and cool the cans, this time under atmospheric pressure. Such a cooling may be accomplished in a single cooling unit but to avoid the necessity of too large a chamber at this point it has been found better to provide two cooling units. Accordingly there is disclosed in the drawings a two-unit cooling system for cooling in atmospheric pressure.

In the first of these units agitation is carried on in a cradle-like agitating apparatus which may be the same in construction and operation as that used in the preceding chambers. This cradle is located in an open top tank which provides the cooling chamber and also rotates in a bath of water.

The cans are still warm after passing through the first atmospheric pressure cooling section and are removed by a transfer turret which introduces them into the final cooling chamber. This chamber is also open to atmosphere and as disclosed in the drawings houses a helical path of travel for the cans.

Provision is made for carrying the cans in upright position at the same time elevating them along their helical path. From the top of the chamber the cans either pass through sprays of water discharged from overhead sprinklers or the chamber may be partially filled with water. When finally discharged at the top, by a turret feed member, the cans are substantially at room temperature.

The milk product within the can is completely sterile, is hermetically sealed and when cooled there is a vacuum in the can. The product does not have the cooked taste so often found in canned milk but retains its natural flavors, color, etc.

It has been found that where non-condensible gas such as air is used instead of steam in the filling and sealing chambers that there will be less vacuum in the finally cooled cans. The use of air, or even a mixture of air and steam will be advantageous where the more fragile cans are used, that is, cans not capable of sustaining the greater strains on their seams or other parts, occasioned by the external atmospheric pressure. A balance of air and steam can thus be used to create the desired vacuum in the finally cooled can.

An embodiment of the present invention is disclosed in the drawings as an organized apparatus consisting of a number of connected units. The operation of this apparatus as a whole is continuous so that as cans and milk enter continuously from one end, the sealed and sterilized cans are discharged in processional order from the other end. As one example of the operation of such an organization the handling of evaporated milk will be considered.

The capacity of the entire line will be arbitrarily assumed to be 60 cans per minute which means that 60 cans are introduced into the machine every minute together with the proper amount of milk to fill the cans. After passing through the various steps of the invention, therefore, the sealed cans with their fully sterilized contents are discharged from the apparatus at the rate of 60 cans per minute.

In this example of processing evaporated milk at the rate of 60 cans per minute there will be at any one time possibly 60 sealed cans within the holding chamber, 25 cans within the pressure cooling chamber, 120 cans undergoing cooling at atmospheric pressure in the first atmospheric pressure cooling chamber and possibly 225 cans undergoing cooling in the second and last atmospheric pressure cooling chamber.

The mechanical features relating to the organized apparatus comprise a closed tank 21 (Figs. 1 and 3) having end closures 22. This houses a forewarming chamber 23 in which raw milk, evaporated milk, cream or other milk products are first treated in order to store a sterilizing heat therein.

Figure 1:
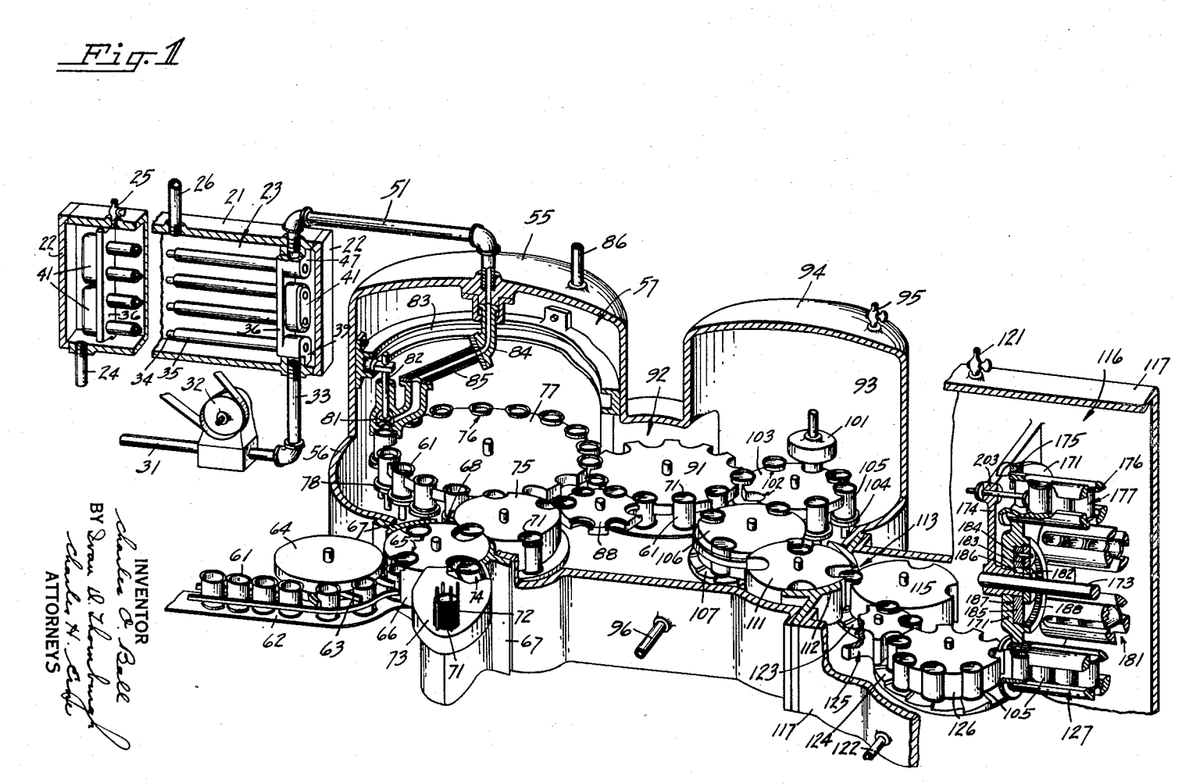
Figures 1 and 2 are schematic perspective views partly broken away, of an organized apparatus for carrying out the steps of the instant method and embodying the invention, Fig. 1 illustrating what constitutes substantially the first half of the organization and Fig. 2, the second half.
Figure 3:
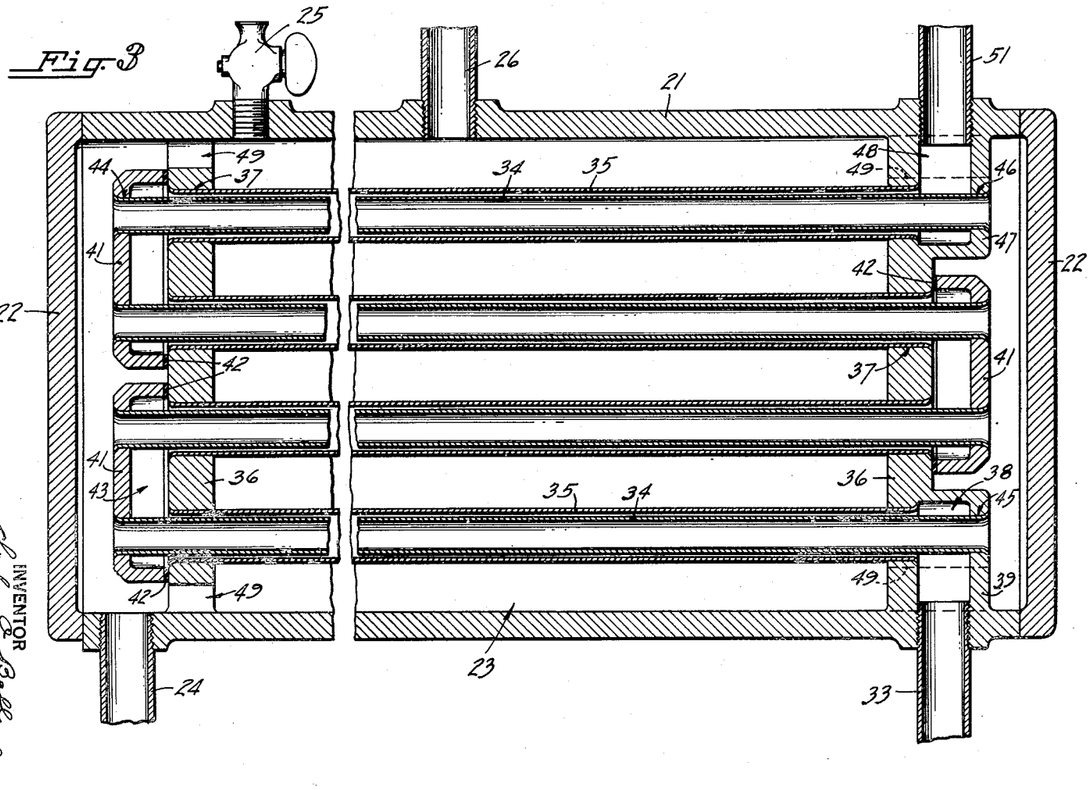
Fig. 3 is an enlarged longitudinal sectional view of the preheating unit illustrated in the extreme left of Fig. 1.

The chamber at its bottom is provided with a drain pipe 24 so that condensate of the steam used in heating the milk may be drawn off at intervals as needed. A vent valve 25 is secured into the top wall of the tank 21 by means of which the chamber may be vented when heat is first applied or when otherwise needed. The heat is used for the forewarming step is best supplied by saturated steam which may be introduced into the top part of the chamber through a supply pipe 26.

The milk or milk product being heated at this stage does not contact directly with the steam within the chamber 23 but is caused to circulate through suitable coils during which time it is spread out or its mass is separated into a thin film which is caused to traverse a relatively long path of travel during which time it passes between heated surfaces. The details of this filming and circulating step are best illustrated in Fig. 3.

The milk is first delivered to the forewarming chamber through a supply pipe 31 (Fig. 1) which passes the milk into a pump 32, the delivery end of which connects with the tank through a pipe 33 which is threadedly secured into the bottom tank wall.

The coil system for filming and circulating the milk comprises a series of inner and outer concentrically mounted tubes designated respectively by the numerals 34, 35 which are horizontally disposed inside of the tank. Web or header members 36 are also disposed inside of or are formed as sections of the tank, a header member being adjacent to but spaced inwardly from each of the tank end walls 22. Each outer tube 35 is anchored at its ends in the two header members, the tubes passing through suitable bores 37 formed in the webs, the ends of the tubes being swaged over in a tight fit.

The open end of the lowermost tube 35 where it passes through the right-hand header 36 (Fig. 3) communicates with a passage 38 formed in a web extension or housing 39. It is into this chamber 38 that the incoming milk flows from the pipe 33 being forced in under pressure by the pump 32.

Elongated cup shaped shell members 41 are disposed in the space between each header 36 and the adjacent end wall 22 of the tank and the open side of each shell is connected with the header in a packed joint 42. Each shell is of a shape and size to enclose the ends of two adjacent outer tubes 35 where these tubes pass through the web. This construction provides a connecting passage 43 between the adjacent tubes and provides for a circulation of milk from tube to tube.

The ends of the inner tubes 34 extend beyond the ends of the outer tubes and pass through the end walls of the shell members, being tightly fitted in bores 44 formed therein. To effect this fit the end of each inner tube is swaged into the end wall of the shell with which it is associated. This construction provides a double boiler tube construction there being no connection between the interior of the inner tubes and the interior of the outer tubes. This also leaves a space between the outer wall of the inner tube and the inner wall of the outer tube, the distance between adjacent walls being relatively small as for example a sixteenth of an inch.

The right-hand end of the lowermost inner tube 34 (Fig. 3) extends through the upper part of the chamber 38 and through an opening 45 formed in the end wall of the extension 39. This end of the tube like the other end is swaged out and forms a tight joint with the end wall of the housing 39. The right-hand end of the uppermost inner tube 34 extends through and tightly fits an opening 46 in the end wall of an extension housing 47 formed in the header 36 and this housing encloses an exist passage 48 which is similar in construction to the entrance passage 38 at the bottom of the tank.

The milk passing into the chamber 38 from the supply pipe 33 flows through the space between outer and inner tubes and this spreads the milk into film form. After passing through the first or lower set of tubes and through the left-hand header wall 36 (Fig. 3) the milk passes up through the passage 43 and thence back by way of the next set of tubes. This continues until the milk has traversed the entire system and has passed into the passage 48 where it leaves the forewarming chamber. During this passage it is heated to a high degree of temperature, receiving its heat through the walls of the concentric tubes. These surfaces are heated by the steam within the forewarming chamber 23.

The header members 36 are perforated as at 49 and this provides for free circulation between the central part of the chamber and the end spaces between the headers and the end walls of the tank. Steam coming into the pipe 26, therefore, circulates through the inner tubes 34 as well as around the outside of the outer tubes 35 and through the other spaces inside of the tank. As the milk in its thin film-like form picks up or absorbs the heat from the spaced surfaces afforded by the concentric tubes, more heat is immediately supplied to the surfaces by the circulating steam. The hot milk leaves the tank by way of a feed pipe 51 which conveys it into the next unit of the apparatus.

The milk when it is first introduced into the pump 32 may be at a relatively low temperature, as for example 45° F. The pump forces the milk along its circulative path within the forewarming chamber 23 and a great pressure is exerted by the pump to drive the milk through the system. This pressure may be as much as one thousand pounds per square inch, depending upon the resistance offered by the filming of the milk and by its circuitous course. A satisfactory temperature for the milk as it leaves the forewarming chamber has been found to be about 265° F. and this or a higher degree of temperature is accordingly maintained in the forewarming chamber with a corresponding steam pressure of perhaps 35 pounds per square inch.

The milk flowing from the forewarming chamber by way of the pipe 51 passes into the upper part of a dome section 55 (Fig. 1) of a main housing 56. The dome section 55 encloses a filling chamber 57 in which is located the filling unit of the apparatus. Here the milk is deposited into open top cans 61.

The cans are introduced into the machine in any suitable manner one form, as illustrated, comprising a runway 62 in which the cans are brought into the influence of feed arms 63 associated with a feed turret 64. These cans are then individually inserted into pockets 65 of a can feed valve 66 which is located exteriorly of the housing 56 and which operates in a valve seat 67 associated with the housing. This valve maintains a seal for an opening 68 formed in the wall of the valve seat 67 through which the cans are brought into the filling chamber 57.

The valve 66 also functions as a cover introducing member. Can covers 71 are fed from a magazine 72 carried in a cover feed casing 73 associated with the valve seat 67 and individual can covers are removed from the bottom of the magazine and are fed along a passage 74 and are deposited into the pockets 65 of the valve. This feeding of a can cover into the pocket of the valve takes place prior to the introduction of a can into the same pocket and accordingly when a can enters a valve pocket it passes beneath a can cover previously positioned in that particular pocket.

Can covers are in this way carried by the valve 66 and like the cans are introduced through the opening 68 and are brought into the filling chamber. Within the chamber both can and cover are transferred to a turret 75 which in turn feeds the covers and cans into different turrets. The covers will be followed later in the description but first the can movement will be noted. The cans individually pass into pockets 76 of a turret member 77 which is associated with the filling machine. A can support member 78 is located adjacent each pocket 76 and moves with the turret and each incoming can slides over and seats onto its particular support as it enters its pocket.

In the drawings there is only graphically illustrated one section of a filling unit but it will be understood that there will be as many sections in the filling machine as there are turret pockets 76. The particular type of filler which may be used in carrying out the filling step of the present invention is unimportant as great variation in mechanical construction is possible for this purpose and therefore further detail is thought unnecessary. Accordingly there is indicated in Fig. 1 a single filling head 81 which is associated with its can support 78. The operation of filling in each filling head is valve controlled as by a valve member 82 which is actuated by a stationary cam 83 fixed to the inside wall of the dome section 55.

A discharge end of the pipe 51 is associated with a milk receiving nipple 84 which conveys the milk into an air jacketed or heat insulated tube 85 associated with the filling head 81. When the proper time comes for filling into a positioned can a measured quantity of milk is discharged into the open mouth of the can. This constitutes the filling operation. Any heating effect of the filling chamber on the milk while in the tube 85 is avoided as much as possible to prevent coating of the inside of the tube with milk solids. This is the function of the air jacket.

For some milk products it is desirable that the filling chamber 57 be maintained under high heat and as an example of one manner of heating, steam may be introduced through a pipe 86 which passes into the top of the dome section 55. This steam may be at high temperatures, for example 270° F. Where steam is used at such a temperature it provides a pressure sufficient to prevent boiling of the milk either while in the filling head or within the open cans after filling and while the cans are in the chamber.

If a non-condensible gas such as compressed air, either heated or unheated, is used in the filling chamber, instead of steam, the pipe 86 will be utilized as a supply pipe for such pressure medium.

It is just prior to a can 61 passing into a turret pocket 76 that the can cover 71 leaves the pocket. The can cover is transferred into a can cover turret 88 by means of which it is advanced into a position for uniting with a filled can then being carried in an assembly turret 91, this can having been just transferred from the filling machine. Each filled can with its applied cover is then advanced by the assembly turret.

The assembly turret is located in an intermediate or connecting chamber 92 situated between the filling chamber 57 within its dome 55 and a sealing chamber 93 enclosed within a second dome section 94. The dome sections 55, 94 may be an integral part of or may be separate from but closely associated with the housing 56. The intermediate chamber 92 provides free communication for heat and pressure in both filling and sealing chambers so that the same temperature and pressure obtains in the two chambers.

In some installations it may be desirable to separate the filling and the sealing chambers and where this is done the turret 91 will be replaced by a valve and the chamber 92 will be dispensed with. In the present disclosure where the same heat and pressure is maintained in the two chambers 57, 93 the single pipe 86 is used for supplying steam to both chambers. A vent valve 95 is preferably located in the top of the dome section 94 in order to free the chambers of air when the apparatus is first started in its operation. A drain pipe 96 passing through the walls of the housing 56 is also desirable for draining out any condensate from the chambers.

It will be obvious that the filling and sealing chambers as here constructed are equally well adapted to the use of compressed air instead of steam if an air pressure medium is used.

A seaming mechanism 101 is located in the sealing chamber 93 and may be of any suitable construction, the present disclosure merely schematically showing a typical seaming head which may be mounted and operated in the usual way. The can and their covers are introduced into pockets 102 of a seaming turret 103 and in so doing come to rest upon can supports 104 carried in the seaming turret. Each support 104 is raised to position the can for seaming in the seaming head and its cover is hermetically sealed onto the can.

After sealing the hermetically sealed can (which will now be indicated by the numeral 105) is transferred from the turret 103 into a turret 106 the latter being also located inside of the sealing chamber. Agitation of the product in the sealed can begins while the can is being transferred by the turret 106 and to accomplish this the cans are moved over a stepped or uneven surface or track 107 and in so doing the cans are jounced up and down within the turret pockets.

This turret passes the sealed cans 105 into an exit valve 111 which operates within a valve seat 112 associated with the housing 56. The valve 111 conveys the sealed cans through an opening 113 formed in the valve seat 112 and introduces them into a turret 115 which operates within a sterilizing or holding chamber 116.

Figure 2:
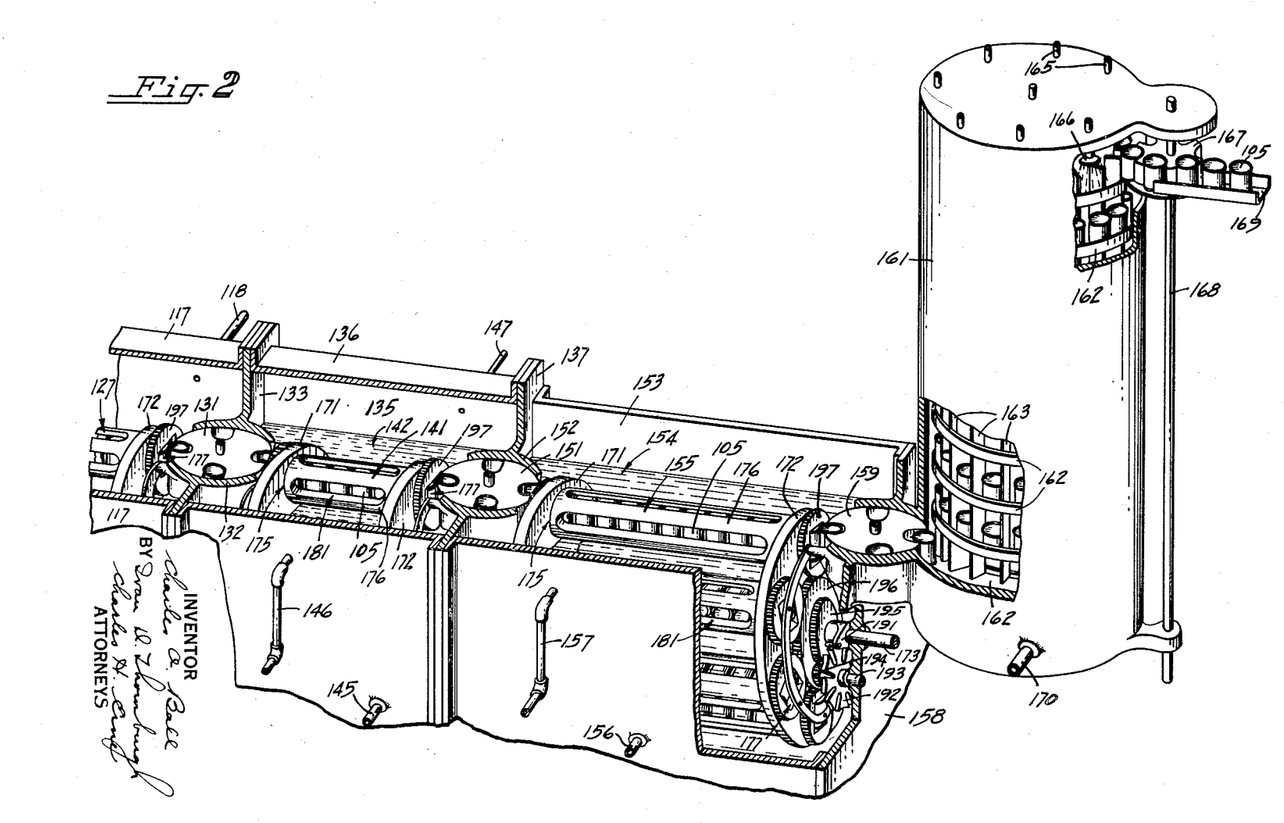

Chamber 116 may be enclosed in a suitable housing 117 which joins with the housing 56. The holding chamber 116 is maintained under heat and pressure and for this purpose steam may be introduced into the chamber by means of a steam pipe 118 (Fig. 2). A vent valve 121 is preferably located in the top of the housing 117 by means of which air is eliminated from the chamber 116 when first filling it with steam. A drain pipe 122 may also be used to draw off the steam condensate from the bottom of the housing 117.

As an example of the heat and pressure used in the chamber 116 which would be satisfactory for some milk products, a temperature of 265° F. is suggested. If such a temperature be maintained by saturated steam, it will be accompanied by a gauge pressure of approximately 24 pounds per square inch. It is while the cans are in the holding chamber 116 that sterilization is completed by means of the residual heat that was stored in the milk before filling.

The cans are agitated during their transfer by the turret 115. At such a time the cans pass over an uneven or stepped track 123 and are jounced up and down within their turret pockets. The cans now pass from the turret 115 into a turret 125 and from thence into a turret 126. Agitation still continues, the cans bumping up and down while being conveyed in both of the turrets 125, 126. A stepped track 124 extends under both turrets for this purpose.

The turret 126 operates as a feeding device for placing the cans into a cradle-like revolving structure which constitutes an agitating apparatus 127. The details of construction of this apparatus are the same as agitating apparatus in two other chambers through which the cans subsequently pass and in view of this circumstance, a detailed description will not be given at this time. This permits an uninterrupted description of operations to which the can is subjected throughout all of the units of the organization.

It may be said, however, that the agitating apparatus 127 within the chamber 116 carries the cans in helical paths of travel while advancing them from the entrance end of the chamber to an exit end. During this time the cans are turned end over end and their contents are agitated while the heat of the contents is retained or allowed to escape very slowly and while the contents are being sterilized. This chamber when evaporated milk is being processed is preferably maintained at an operating temperature of 260° F.–270° F. and under a corresponding gauge pressure of approximately 21–27 pounds per square inch if the temperature and pressure are maintained by saturated steam.

When a can has completed its travel through the chamber 116 it is discharged into a valve turret 131 (Fig. 2) which is located adjacent the upper or top part of the chamber and on the side opposite to the feed-in turret 126. This valve operates in a valve seat 132 formed in an end frame 133 secured to the end of the tank 117. By means of the valve 131 the can is removed without loss of heat or pressure from the chamber 116.

The valve 131 passes the can into the pressure cooling chamber which is designated by the numeral 135 this chamber being enclosed within a tank 136 one end of the tank being secured in an air-tight seal to the end wall 133, the opposite end being closed by an end wall 137. An agitating device 141 of the same type as apparatus 127 is located in the chamber 135 and this device operates in the same manner.

Here again the cans are carried in a helical path of travel at the same time that they are turned end over end. Agitating device 141 rotates within a water bath (indicated by the numeral 142) and a head space within the tank 136 and above the water level is filled with compressed air so that a pressure of substantially 20 to 30 pounds per square inch is maintained within the chamber 135 and is effective upon the cans while in the head space or while passing through the water bath 142.

Water for this purpose may be caused to circulate into and out of the tank while the desired water level is maintained. In Fig. 2 of the drawings an inflow pipe 145 is shown leading into the side of the tank and an overflow pipe 146 extends out from the tank wall. Air under compression may be brought into the head space through a pipe 147. The cans passing along their circuitous paths of travel in chamber 135 are agitated, are submerged in the water a number of times and are also brought out into the head space above the water a number of times. They are constantly subjected to pressure either through the water or through the compressed air in the space above the water. The water extracts a certain amount of the heat from the can and its contents and this pressure, effective on the outside walls of the can, prevents the can bursting or becoming permanently distorted.

Cans upon reaching the end of their travel within the apparatus 141 are removed from the chamber 135 by a valve 151 which operates within a valve seat 152 formed in the end wall 137. This valve while maintaining the pressure and also the water within the chamber 135 delivers the cans into an open top trough or tank 153 containing a water bath 154, the tank closed at one end by the wall 137. An agitating apparatus 155 is located and operates in the tank 153 and in the water of the tank, this apparatus being identical in construction and operation to the agitating devices 127, 141 of the preceding chambers.

At the time a can enters into the tank 153, its heat has been reduced to substantially 225° F. and the interior of the can is therefore at an absolute pressure of from 19 pounds to 25 pounds per square inch, depending upon whether the sealing chamber be occupied entirely by saturated steam or by a mixture of saturated steam and a non-condensible gas. The can being brought into atmosphere is, of course, exteriorly subjected to the atmospheric pressure of say approximately 15 pounds to the square inch. The difference of pressures outside and inside of the can, therefore, is not sufficient to cause undue strains on the can seams. The temperature of 225° is considered a safe temperature for the can.

The turret 151 positions the can into the apparatus 155 and again the cans are carried through a helical path of travel during which time they are turned end over end and the contents once again agitated. The cans are also submerged in the water of the bath 154 a number of times, and the cans further cool, this time in water at atmospheric pressure. An inflow pipe 156 is shown leading into the side of the tank 153 and an overflow pipe 157 extends out from this tank wall thus providing for maintenance of water level within the water bath.

The exit end of the tank 153 is closed by a wall 158 in which a turret 159 transfers the cans from the cooling chamber of the first atmospheric pressure cooling tank and delivers them into the bottom of a vertically disposed tank 161 in which further cooling takes place also under atmospheric pressure.

The cans moving into this tank move onto the bottom run of a helical track 162 and each can passes in between vertically arranged propelling blades 163 which are moving around and around inside of the tank. These blades slide the cans, while in upright position, along the helical track and adjacent the inside wall of the tank at the same time elevating them. In the upper part of the tank the cans are subjected to water sprays the water being introduced through pipes 165 which pass into the top of the tank. The water is discharged as spray through sprinkler nozzles 166.

In some installations it may be desirable to partially fill the tank 161 with water through which the cans will move as they traverse their upward helical path of travel.

At the upper or discharge end of the helical path of travel the cans pass into a discharge turret 167 which is mounted on a vertical shaft 168. Shaft and turret rotate so that the cans within the turret are deposited into a storage runway 169. The cans at this time are completely cooled and at substantially room temperature. A drain pipe 170 disposed in the side of the tank 161 near its bottom is provided for draining off the spray water from the nozzles 166.

By reason of the condensation of steam which takes place as the milk in the can cools there is a substantial vacuum in the can. The amount of vacuum may be controlled in large part by the heat and pressure conditions in the filling and sealing chambers 57, 93 when the milk first enters the cans and when the cans are sealed. If the filling and sealing of the can takes place in a compressed air atmosphere instead of steam the resulting vacuum in the can has been found to be greatly reduced. This fact may be utilized to vary the final vacuum in the can by using heated air in place of steam or by using a mixture of air and steam.

A full consideration of the details of the agitating apparatus will now be given. Practically the only difference in the structures of the devices 127, 141, 155 relates to over all dimensions and length of can travel, this also making a difference in capacity. Apparatus 141 is the shortest having a capacity of substantially 25 cans, while device 155 is the longest with a capacity of 120 cans. Device 127 may hold 60 cans at one time but it will be understood that these capacity figures are arbitrary and are only suggested by way of example.

Each agitating apparatus comprises two head or end members 171, 172 (Figs. 1, 2 and 4) which are carried on a horizontal center shaft 173. This shaft is supported in suitable bearings formed in web parts 174 of the housing or in some cases bearings are formed directly in the end walls of the various tanks. The heads 171, 172 provide end supports or bearings 175 for a number of rotating can receiving tubes 176 which are radially disposed relative to the center of the shaft 173. In the drawings six of such tubes are illustrated for each agitating apparatus.

Each tube 176 is formed with a longitudinal channel 177 which is of the proper size and shape to loosely hold the sealed cans 105. These cans are individually introduced into one end of each tube as that tube passes into proper position to receive the can. This feeding of a can into a tube is effected by the turret 126 in the first chamber 116 or by the valve 131 or the valve 151 for the other chambers. The mouth or can entrance end of each channel 177 is flared outwardly as at 178 (Fig. 4) to permit introduction of a can without interruption of the can travel.

Figure 4:
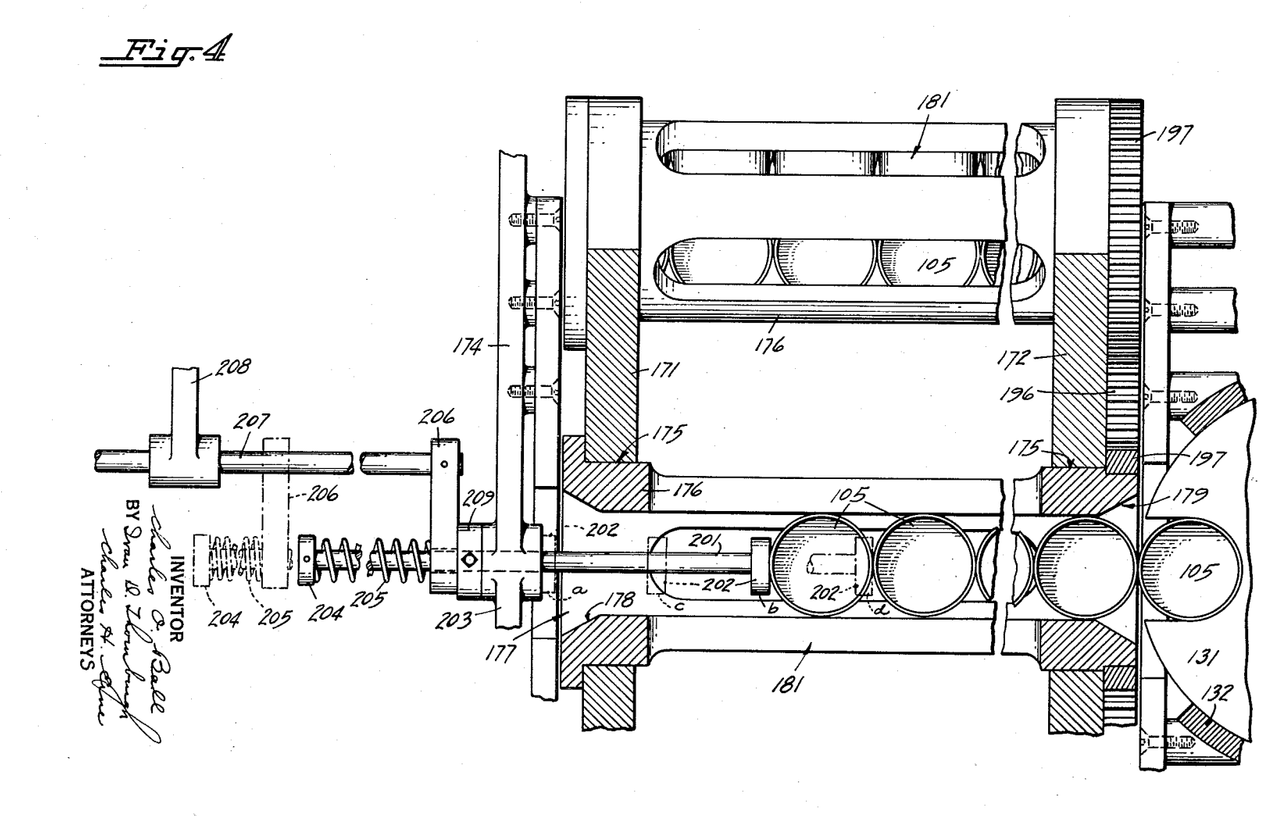
Fig. 4 is a combination side elevation and sectional view drawn on a larger scale, of a sealed can agitating unit such as is used in each of the three chamber sections (one heating and two cooling chambers) shown in Fig. 2.

The cans within a channel are disposed in a single row and each can row is continuously and slowly carried around the shaft 173 as a center and in addition the cans in the row are turned end over end at a faster rate the center of the tube forming the axis for this latter movement. The end over end movement is in the instant disclosure intermittent and is synchronized with turret and valves so that a tube is on its rest period when a new can is introduced into its flared mouth 178.

There is a third movement of the cans while in an agitating apparatus, this being longitudinally of the channel and this movement is also intermittent. The longitudinal movement is effected by the incoming can crowding over the other cans in the row at which time a can is discharged from the opposite end of the tube channel the exit end of the channel being also flared out as at 179 (Fig. 4).

The can tubes 176 are laterally slotted as at 181 so that the cans while in these tubes are subjected to the full chamber conditions of steam, pressure, water or atmosphere as the case may be. Furthermore, the cans only loosely fit in the tube channels 177 so that full circulation of steam, water, etc., is had at all times around the walls of the cans.

The continuous, slow rotation of the cradle unit will first be considered. The center shaft 173 is the drive shaft for this purpose and rotation is transmitted by means of a gear arrangement associated with each agitating apparatus. Such a gear arrangement is shown for apparatus 127 at the right of Fig. 1 and an understanding of the drive for this unit will suffice for all of the units.

A gear 182 is carried by the shaft inside of each head 171 and meshes with an idle gear 183 loosely mounted on a stub shaft 184 which is supported in a stationary disc 185. Disc 185 is keyed at 186 to a hub extension of the bearing for the shaft 173 and is located in a pocket 187 formed in the inner face of the head 171. The idler gear 183 also meshes with an internal gear 188 formed as an integral part of the head. This construction gives a gear reduction in the transmission of rotation of the drive shaft 173 to the cradle unit.

A Geneva drive mechanism is employed to impart the proper intermittent motion to the can tubes 176 of the agitating apparatus. This comprises a Geneva arm 191 (see the right hand side of apparatus 155 in Fig. 2) which cooperates with a Geneva wheel 192 to impart step rotation to a Geneva wheel shaft 193 journaled in suitable bearings formed in the end wall 133, 137 or 157 depending upon the particular unit involved.

The shaft 193 carries a pinion 194 which meshes with a central gear 195 that is loosely mounted on the shaft 173 just outside of the head 172. The gear 195 is secured to a larger central gear 196 these two gears rotating as a single unit and at a relatively slow speed. Gear 196 meshes with gears 197 (see also Fig. 4). There is a gear 197 secured to the protruding end of each of the can tubes. The gear 197 imparts still a further reduced speed of rotation to the can tubes.

When a can tube is on its rest period as held by the Geneva drive mechanism just described the open mouth 178 of the tube is in the proper position to receive a can and at the same time a can is being discharged from the opposite end of the tube. This procedure may be slightly altered, if desired, to cut down the capacity of an agitating apparatus so that a can passes along a shorter helical path of travel and therefore will be subjected to less heating or cooling time.

One way of obtaining such an adjustment is disclosed in connection with the agitating apparatus 127. It will be observed that in this unit the cans are introduced into a tube channel 177 while it is at the bottom and that the cans are discharged from a row when the channel is at the top. This is designed in this case to show what can be done in the matter of changing the capacity of an agitating unit. It is only intended to be illustrative of the principle of adjustment and may be applied to one or more of the units 127, 141, 155.

The discharging of cans from the end of a tube and into the exit valve 131 is accordingly effected by a knockout rod 201 (Figs. 1 and 4) which is provided with a can engaging pad 202. This rod slides in a suitable bearing 203 preferably formed in the web 174. A collar 204 is pinned to the outer end of the rod 201 and provides a support for one end of a spring 205 located on the rod.

An actuating arm 206 is carried on the end of an actuating slide shaft 207 which may be suitably supported in a slide bearing 208. This arm extends over the rod 201 and one end of the spring 205 engages the arm and with that end as a support tends to draw the rod 201 outwardly so that a collar 209 adjustably held on the rod by a set-screw is brought against the arm.

The shaft 207 is operated in synchronism with the other moving parts of the apparatus and during movement of the turret is in an outer or non-actuated position with the arm 206 in the position indicated in dot and dash lines in Fig 4 and the pad 202 is against the bearing 203 (as at $a$). When in this withdrawn position the spring 205 is compressed. The degree of compression will vary in accordance with the setting of the collar 209 on the rod 201 as will soon be further explained. In this outer position $a$ of the pad 202 its inner face is clear of the ends of the can receiving tubes 176, the arm 206 being brought back and away from the collar 209.

When the cradle unit is brought to rest and an empty pocket of the turret 131 is presented at the end of the row of cans, adjacent the discharge end 179 of the tube, the shaft 207 is moved in toward the machine and at the end of the full stroke of the rod 201, its pad 202 is at a position $b$, this being the full line position in Fig. 4.

Analyzing this movement it is found that the pad 202 first engages the adjacent end can in the row, which is the can last placed in the channel 177 by the turret 126 when that particular tube was at the bottom. The next step in the pad movement slides the engaged can along the channel and brings it into engagement with the other cans in the row. The third step in this continuous movement is the logitudinal movement of the entire row of cans along the tube channel, this action discharging the last can in the row into the empty waiting turret pocket.

It will be observed that with this setting the can engaged by the pad 202 is moved through two cam diameter spaces with the pad moving from its position $a$ into its position $b$. Half of this movement results in sliding the entire row of cans when the last can is discharged and accordingly the pad 202 slides the engaged can through one idle space before it reaches the other cans. The agitating apparatus when so set, therefore, is not operating to full capacity and the maximum length of travel of the can is reduced. In other words, its capacity is cut down by an amount equal to one can per tube or six cans for the unit.

By setting the collar 209 in proper position on the rod 201 the pad 202 may be moved only from position $a$ into an intermediate position $c$. Where this is the setting there is no empty space and the apparatus is operating at full capacity, the pad at such time being used only for discharging a can into a waiting turret pocket and not for reducing the length of can travel.

There may be other settings to give more reduction in can travel. For example, in another setting the pad 202 is moved from its position $a$ into a position $d$ which is shown in dot and dash lines (Fig. 4) this latter position of the pad 202 indicating the end of the stroke of the rod 201.

Where this setting obtains the can engaged by the pad is moved through two idle spaces equal to the diameter of two cans. It will be evident that any other setting within limits may be obtained.

The stroke for the shaft 207 is sufficient to provide for the maximum amount of movement of a pad 202 and when this maximum setting is not present the part of the stroke of the shaft 207 which is not used for moving cans is taken up by the expansion of spring 205, the arm 206 at such time moving along the rod 201 before striking the collar 209. It is only after the arm engages the collar that the rod 201 is moved on a can discharging stroke.

It is thought that the invention and many of its attendant advantages will be understood from the foregoing description, and it will be apparent that various changes may be made in the form, construction, and arrangement of parts of the apparatus mentioned herein and in the steps and their order of accomplishment of the process described herein, without departing from the spirit and scope of the invention or sacrificing all of its material advantages, the apparatus and process hereinbefore described being merely a preferred embodiment thereof.

I claim:

1. The method of processing milk products which comprises treating the product at high temperature to store heat therein for subsequent sterilization, filling the heated product into cans and sealing the same within a surrounding atmosphere at high temperature and under pressure to prevent loss of stored heat from the product and to prevent boiling of the product, and agitating the sealed cans in a surrounding atmosphere at high temperature and under pressure to obtain desired viscosity during a holding period while the stored heat in the cans completes the sterilization of the product, said surrounding atmosphere preventing loss of stored heat from the product and preventing straining of the cans during said holding period.

2. The method of processing milk products which comprises treating the product at high temperature to store heat therein for subsequent sterilization, filling the heated product into cans and sealing the same within a surrounding atmosphere at high temperature and under pressure to prevent loss of stored heat from the product and to prevent boiling of the product, agitating the sealed cans in a surrounding atmosphere at high temperature and under pressure to obtain desired viscosity during a holding period while the stored heat in the cans completes the sterilization of the product, said surrounding atmosphere preventing loss of stored heat from the product and preventing straining of the cans during said holding period, and cooling the product within said filled and sterilized cans while continuing the agitation thereof.

CHARLES O. BALL.